Patented Dec. 17, 1940

2,225,534

UNITED STATES PATENT OFFICE 2,225,534

COPOLYMERS OF STYRENE WITH FROSTING DRYING OIL VARNISHES

Robert Barnett Flint and Henry Shirley Rothrock, Wilmington, Del., assignors to E. I. du Pont de Nemours & Company, Wilmington, Del., a corporation of Delaware No Drawing. Application July 18, 1939, Serial No. 285,192

20 Claims. (Cl. 260—23)

This invention relates to new synthetic resins and to coating compositions therefrom.

Interpolymers of styrene with other polymerizable materials including interpolymers of styrene with drying oils (or even with physical mixtures of drying oils with varnish resins), are known to the art, e. g., Lawson and Sandborn, U. S. Patent 1,975,959. These interpolymers, particularly those prepared from "frosting" oils, while useful to a considerable degree are capable of improvement in resistance to frosting or wrinkling on drying and in stability, towards gelation, of their solutions and the process of interpolymerization may be accelerated.

This invention has as an object the preparation of new styrene interpolymers. A further object is the preparation of interpolymers of improved resistance to frosting, greater solution stability and greater rapidity of preparation. Another object is the preparation of new coating compositions. Other objects will appear hereinafter.

These objects are accomplished by the following invention wherein styrene is interpolymerized at a temperature within the range 100–150° C. with a heat-blended frosting-oil varnish obtained by heating the frosting oil with a varnish gum or resin, preferably 5–30% by weight of the drying oil.

By the process of the present invention there can be made resinous interpolymers of styrene with long-oil varnishes which exhibit marked improvement over products disclosed in U. S. Patent 1,975,959 with respect to resistance to frosting and can stability. The interpolymerization also takes place more rapidly. The use of frosting oil varnish, prepared prior to interpolymerization with styrene by heat-blending the raw oil with a small proportion, e. g., 5–30 per cent of a natural or synthetic varnish gum such as rosin or "Amberol", is essential. If, in place of a preformed, i. e., heat-blended varnish, merely a mixture of frosting oil and resin or the oil alone is interpolymerized with styrene, it is found that (1) the rate of interpolymerization is comparatively slow; (2) the reaction mixture often gels before products possessing the desired film-forming properties are obtained; (3) films flowed from the interpolymer solutions tend to wrinkle or frost on drying; and (4) the final products often tend to gel on storage. The process of the present invention is effected by heating the styrene with the preformed, heat-blended drying oil-resin varnish, preferably in the presence of a catalyst such as benzoyl peroxide and an inert solvent such as toluene or xylene. Heating is continued at a suitable temperature such as 120–125° C. until the desired degree of interpolymerization has been obtained. In many cases, this is conveniently determined as the point where films of the resin solution upon baking for 30 minutes at 100° C. or upon air-drying at room temperature are clear and homogeneous and free from wrinkling or frosting. When operating as described in Example I, this stage is reached in about two hours and rapid drying interpolymers which possess excellent gloss, good adhesion, toughness and flexibility, are obtained. After the reaction has proceeded to the point where the product has attained the desired properties, the solution of interpolymer may be used as such, or preferably the excess styrene monomer and solvent are removed (i. e., by distillation under vacuum or by steam distillation), the product isolated thereby being redissolved in a suitable higher boiling inert solvent, such as a mixture of high-boiling aromatic hydrocarbons. The interpolymers are soluble in dioxan, butyl acetate and in aromatic hydrocarbons such as benzene, toluene and xylene, and are relatively insoluble in aliphatic hydrocarbons and alcohols. They are soluble, however, in mixtures of aliphatic and aromatic hydrocarbons.

The more detailed practice of the invention is illustrated by the following examples, wherein parts given are by weight. There are of course many forms of the invention other than these specific embodiments.

Example I

A China wood oil–"Amberol F–7" varnish is prepared by heating 1440 parts of raw China wood oil and 160 parts of "Amberol F–7", an oil-soluble, rosin-modified phenol formaldehyde resin, in an open kettle during a period of 33 minutes up to 225° C. with stirring. The mixture is maintained at this temperature for 15 minutes and then allowed to cool slowly to 80° C. whereupon it is cut with 1500 parts of xylene and filtered through a kieselguhr mat.

A mixture containing 1200 parts of distilled styrene, 400 parts of the above China wood oil–"Amberol" varnish, 1000 parts of xylene and 12 parts of benzoyl peroxide is heated with stirring for two hours at 125° C. After 2 hours, the resin contains about 60% polymeric styrene as shown by a solids determination and films flowed from the solution show no tendency to frost when baked at 100° C. or when air-dried. Unreacted styrene monomer together with most of the xylene is then removed by distillation under reduced pressure, two 500-part portions of a mixture of high-boiling aromatic hydrocarbons being added in turn to replace the styrene and xylene removed. The solution of the interpolymer in the high boiling solvent is then reduced to a total weight of 900 parts and consists of 49.15% solid resin, approximately 60% of the solid resin being polymeric styrene. Flowouts of the interpolymer in 50% solution in the high boiling aromatic hydrocarbon solvent air dry to clear, tack free, colorless films in 5–10 minutes, and show no tendency to frost. On baking 30 minutes at 100° C., clear, hard, tough, and flexible films are obtained which possess good adhesion and excellent resistance to water, dilute aqueous acid, alkali and alcoholic solutions. Samples of the interpolymer solution containing 50% solids show no tendency to gel on standing in an inert atmosphere.

When the above experiment is carried out by the process indicated, excepting that raw China wood oil is used in place of the varnish (i. e., by the method of U. S. Patent 1,975,959), the reaction requires much longer heating to produce the same degree of interpolymerization (about 20 hours); flowouts of the interpolymer solution tend to frost and gas-check and the solution is unstable due to gelation tendencies. Similarly, when styrene is polymerized with a physical mixture consisting of raw China wood oil and 10% "Amberol" in place of the preformed heat-blended China wood oil-"Amberol" (10%) varnish in the same ratio and by the process described above, a longer reaction time is also required to give homogeneous interpolymers, and flowouts of the resin solution tend to frost and gas-check on drying.

*Example II*

A long-oil (240 gallon) varnish comprising five parts oil-soluble p-hydroxydiphenyl-formaldehyde resin and 95 parts raw China wood oil is prepared by heat-blending the mixture at 225° C. for 15 minutes, diluting with 100 parts of xylene and filtering through a kieselguhr mat.

A mixture of 30 parts of the above China wood oil-resin solution in xylene, 90 parts of distilled styrene monomer, 75 parts of xylene and 0.9 part of benzoyl peroxide is heated with stirring for 5 hours at 120° C. Flowouts of the solution air-dry rapidly to give clear, tough, flexible, and glossy films which possess good adhesion and excellent water and alkali resistance.

*Example III*

A mixture of 60 parts distilled styrene, 20 parts of a varnish comprising China wood oil and rosin (10%) in an equal weight of xylene (obtained by cooking, i. e., heat-blending, 90 parts of China wood oil and 10 parts of rosin for 15 minutes at 225° C. and diluting with xylene), 0.6 part of benzoyl peroxide and 60 parts of xylene, is heated with stirring at 125° C. for 4 hours. After removing excess styrene monomer from the reaction mixture, the resin is dissolved in a mixture of high boiling aromatic hydrocarbons and the solution shows no tendency to gel on standing. Flowouts of the resin solution on baking give clear, tough, flexible films. Air-dried films become tack free rapidly and show no tendency to frost.

*Example IV*

A varnish of China wood oil and 10% "Super Beckacite-1001" (a p-tertiary amylphenol-formaldehyde resin) is prepared by cooking the ingredients for 15 minutes at 225° C., the product then being diluted with an equal weight of xylene. To 20 parts of this varnish are added 60 parts of dry distilled styrene, 60 parts of xylene and 0.6 part of benzoyl peroxide and the mixture is heated with stirring at 125° C. for 3 hours. Flowouts of the resin solution air-dry rapidly at room temperature to give clear, flexible, glossy films which show no tendency to frost or wrinkle. Solutions of the resin have good can stability.

*Example V*

Five parts of linseed oil and 20 parts of the 50% China wood oil-"Amberol" varnish solution prepared in Example I are mixed. A mixture of 25 parts of the above, 90 parts of distilled styrene and 0.9 part of benzoyl peroxide is heated with stirring for a total period of five hours at 125° C. After the reactants have been heated one hour, air-dried films of the resin solution are clear and flexible and show no tendency to frost. After 5 hours, flowouts of the resin solution on baking give clear, hard, tough films which possess good gloss and adhesion as well as excellent resistance to water, dilute aqueous acids and alkalis.

*Example VI*

An enamel using the styrene-China wood oil-"Amberol" interpolymer described in Example I is prepared by grinding a mixture of 5.5 parts titanium dioxide and 12.9 parts of antimony oxide for 48 hours with 50 parts of the styrene-China wood oil-"Amberol" (49.15% solids in a mixture of high-boiling aromatic hydrocarbons) resin, thinned with 10 parts of high-boiling aromatic hydrocarbons. The enamel so obtained sprays and brushes readily to give rapid drying films which possess excellent build and gloss combined with the good adhesion and toughness characteristic of the resin binder.

While in the examples above the preferred drying oil, China wood oil, is used, the invention is applicable to and generic to the use of heat-blended products of varnish resins with any drying oil or combination of drying oils which tends to frost or wrinkle on drying, i. e., to any frosting drying oil. Other such oils are oiticica oil and Japanese wood oil or combinations thereof with other oils, which combinations frost on drying. The oil need not be the raw oil but may be blown or bodied.

The heat-blended drying oil varnishes which are interpolymerized with styrene to give the products of the present invention are prepared by cooking, i. e., heat-blending according to standard varnish-making practice, the frosting-drying oil with a small proportion, i. e., 5–50%, desirably 5–30%, but preferably 5–10% of a varnish gum at an elevated tempearture, i. e., 175–260° C., lower temperatures requiring longer cooking times prior to interpolymerization with styrene. Any oil-soluble resin, i. e., any varnish gum or resin, natural or synthetic, may be thus heat-blended with the frosting-drying oil, including rosin, copals, oil-soluble phenol-formaldehyde resins, ester gums and phenolic modified ester gums, e. g., those known in the trade as "Amberols," cumarone-indene resins, etc. Mixtures of non-frosting drying oils with the heat-blended drying oil varnishes may be used as is illustrated in Example V.

In the preparation of the varnishes, mixtures of frosting oils, e. g., China wood plus oiticica oils, or mixtures of non-frosting drying or semi-drying oils with frosting oils, e. g., linseed, soya bean, or castor oil plus China wood oil may be used instead of a frosting drying oil alone.

Instead of one varnish gum, mixtures of two or more gums may be used. The use of low proportions (i. e. 5-10%) of varnish gum in the varnish compositions is preferred but the invention is applicable to oil-gum compositions wherein the gum comprises 5-50% of the mixture. The higher proportions of gum, i. e. 30-50% tend to promote brittleness and where higher proportions of gum are employed, it is usually preferred to decrease the amount of styrene in the final interpolymer. The varnishes which are to be interpolymerized with styrene may be heat-blended at temperatures of 175-260° C. for a time dependent on the oil-varnish ratio, a longer time being used for lower temperatures, a shorter time for higher temperatures. For any given composition and temperature, the varnish may be heat-blended for a number of different lengths of time. The oil-gum ratio, type of oil, type of gum, etc. all play a part. The upper limit is determined by the gelation of the mix. Thus, heating at 225-230° C. for 30 minutes at 10% gum does not cause gelation, whereas gelation occurs in 45 minutes at the same temperature and gum concentration.

The interpolymerization of styrene and oil varnishes is preferably conducted in the presence of inert solvents such as xylene, toluene, benzene or other organic diluents which serve as mutual solvents for both reactants and products. However, the reaction may be carried out in the absence of inert solvents, especially when a large excess of styrene monomer is used, but the reaction mixture in the absence of inert diluents is more apt to gel before desirable products are obtained. The invention is not limited as to the ratio of styrene to varnish in the initial reaction mixture for valuable products may be obtained by varying the relative amounts over wide limits. An excess of styrene is preferably employed and the interpolymerization is preferably discontinued when the interpolymer contains approximately 55-65% polymeric styrene. However, valuable products are likewise obtained when somewhat greater or lesser amounts of styrene are interpolymerized with the varnish. Film properties are not so desirable when appreciably less than 50% styrene is present in the interpolymer. However, when varnishes prepared from mixtures of frosting oils and non-frosting oils, or frosting oil varnishes mixed with non-frosting oils are employed, the preferred proportion of styrene in the final interpolymer will vary somewhat depending on the particular choice of oil mixture selected. Likewise, the amount of styrene in the interpolymer will generally be diminished as the proportion of varnish gum in the varnish is increased. It is preferable to remove any excess styrene monomer from the reaction products and essentially complete recovery of such styrene may be obtained by vacuum or steam distillation.

The invention is not limited to the specific reaction temperatures and pressure conditions which are disclosed in the examples, for the temperature and pressure may also be varied over wide limits and satisfactory products are obtained.

The interpolymerization may be conducted at any suitable pressure and at any temperature at which the reaction proceeds at a suitably fast rate and usually in the range of 100-150° C. However, this depends in part on the concentration, amount of excess styrene, amount and type of catalyst, etc. Subatmospheric pressure is not ordinarily used and the inconvenience of pressure vessels ordinarily overbalances any advantage of operating at superatmospheric pressure. The time of interpolymerization depends on the factors enumerated above and differs with the amount of styrene required in the interpolymers. Usually 1-8 hours will be required. Stirring also influences the rate of reaction.

While the examples disclose only benzoyl peroxide as the catalyst any catalyst effective to polymerize styrene may be used including organic peroxides in general, e. g., acetyl peroxide and urea peroxide, also ozone, stannic chloride, and the like. Actinic light may also be employed. Polymerization may be effected by heat treatment alone in the absence of catalysts, but generally this procedure is more lengthy.

Relatively pure styrene monomer is preferably employed but commercial styrene available in concentrated or dilute solutions is also satisfactory for the preparation of these products. Preferably, the styrene should be essentially free of polymer. Small proportions of other vinyl or vinylidene compounds such as methyl methacrylate or methyl vinyl ketone may also be incorporated with styrene in the preparation of interpolymers of this invention. In certain cases this procedure brings about certain advantages. Thus, the use of mixtures of styrene with methyl methacrylate gives products which dry to films of improved hardness.

The new styrene oil varnish resins are highly useful as coating compositions. Films of the resins dry rapidly in the air or on baking to give clear, flexible and tough, adhesive films which are unusually resistant to water, dilute alkalies, acids and alcohols. Driers are not necessary but give advantages, for example, in improved adhesion. Solutions of the resins in suitable solvents may be either sprayed or brushed to give films of high gloss and build. If desired, suitable plasticizers, such as dibutyl phthalate, dixylylethane, etc. may be added to modify the properties of the polymers. Pigments may be readily dispersed in these resins to give enamels which likewise possess attractive drying and film properties. The products are highly useful, therefore, as coatings for textiles, cloth and fabrics, transparent films, paper, wood, leather, metals, stone, brick, cement, glass, and wire, etc. The resins are further useful as molding compositions or as binders for fillers, pigments, dyes and the like.

In combination with wax, the resins are valuable as moisture-proof coatings for transparent foils such as "Cellophane."

By the process of the present invention, styrene can be interpolymerized with oil varnishes at a high rate of interpolymer formation to give soluble resinous materials which have excellent film-forming properties. Furthermore, these new interpolymers wherein a drying oil-resin varnish is interpolymerized with styrene are greatly improved in comparison with interpolymers of styrene with a drying oil alone or a physical mixture of drying oil and resin such as those disclosed in U. S. Patent 1,975,959, particularly in such important respect as resistance to frosting and can stability.

The above description and examples are intended to be illustrative only. Any modification of or variation therefrom which conforms to the spirit of the invention is intended to be included within the scope of the claims.

We claim:

1. An interpolymer of styrene with a preformed, heat-blended resin-frosting drying oil varnish.

2. An interpolymer of styrene with a preformed varnish, said varnish comprising a frosting drying oil heat-blended with an oil-soluble varnish resin.

3. The interpolymer of claim 2 wherein the resin is an oil-soluble, rosin modified, phenol-formaldehyde resin.

4. The interpolymer of claim 2 wherein the resin is rosin.

5. The interpolymer of claim 2 wherein the resin is a p-tertiary amylphenol-formaldehyde resin.

6. A coating composition comprising an interpolymer of styrene with a preformed, heat-blended frosting drying oil-resin varnish.

7. A coating composition comprising a pigment and an interpolymer of styrene with a preformed, heat-blended resin-frosting drying oil varnish.

8. Process which comprises heat-blending a frosting-drying oil with an oil-soluble varnish gum and interpolymerizing the resultant heat-blended varnish with styrene.

9. Process which comprises heat-blending a frosting-drying oil with an oil-soluble varnish resin in amount equal to 5–50% of the resin-oil total at 175–260° C. and interpolymerizing the resultant heat-blended varnish with styrene.

10. Process which comprises heat-blending a frosting-drying oil with an oil-soluble varnish resin in amount equal to 5–50% of the resin-oil total at 175–260° C. and interpolymerizing the resultant heat-blended varnish with styrene at 100–150° C. in the presence of a solvent and a catalyst for the polymerization.

11. Process which comprises heat-blending a frosting-drying oil with an oil-soluble varnish resin in amount equal to 5–50% of the resin-oil total at 175–260° C. and interpolymerizing the resultant heat-blended varnish with styrene at 100–150° C. in the presence of a solvent and a catalyst to produce an interpolymer containing 55–60% styrene.

12. Process which comprises heat-blending China wood oil with an oil-soluble varnish resin in amount equal to 5–50% of the resin-oil total at 175–260° C. and interpolymerizing the resultant heat-blended varnish with styrene.

13. Process which comprises heat-blending China wood oil with an oil-soluble rosin modified, phenol-formaldehyde resin in amount equal to 5–50% of the resin-oil total for 5–45 minutes at 175–260° C. and interpolymerizing the resultant heat-blended varnish with styrene.

14. An interpolymer of styrene with a preformed, heat-blended resin-frosting drying oil varnish, said varnish having combined therein, based on the weight of the drying oil, 5–30% of the resin.

15. An interpolymer of styrene with a preformed varnish, said varnish comprising a frosting drying oil heat-blended with an oil-soluble varnish resin, said varnish having combined therein, based on the weight of the drying oil, 5–30% of the resin.

16. The interpolymer of claim 15 wherein the resin is an oil-soluble, rosin modified, phenol-formaldehyde resin.

17. The interpolymer of claim 15 wherein the resin is rosin.

18. The interpolymer of claim 15 wherein the resin is a p-tertiary amylphenol-formaldehyde resin.

19. A coating composition comprising an interpolymer of styrene with a preformed, heat-blended frosting drying oil-resin varnish, said varnish having combined therein 5–30%, based on the weight of the drying oil, of the resin.

20. A coating composition comprising a pigment and an interpolymer of styrene with a pre-formed, heat-blended resin-frosting drying oil varnish, said varnish having combined therein 5–30%, based on the weight of the drying oil, of the resin.

ROBERT BARNETT FLINT.
HENRY SHIRLEY ROTHROCK.